Patented July 24, 1951

2,562,139

UNITED STATES PATENT OFFICE 2,562,139

MANUFACTURE OF STABILIZED, HEAT-VULCANIZING RUBBER CEMENTS

Arthur W. Campbell, Terre Haute, Ind., assignor to Commercial Solvents Corporation, Terre Haute, Ind., a corporation of Maryland No Drawing. Application June 23, 1948, Serial No. 34,837

10 Claims. (Cl. 260—33.4)

This invention relates to manufacture of stabilized, heat-vulcanizing rubber cements; and it comprises a rubber cement containing from about 2 to 25 per cent of an undegraded, unsaturated, sulfur-vulcanizing rubber dissolved in a rubber solvent, a small amount of sulfur, from about 1 to 5 per cent of zinc oxide, an ultra-accelerator and from about 5 to 20 per cent of an unsaturated monohydric alcohol, containing from 3 to 10 carbon atoms, in amount sufficient to prevent irreversible gelation of the cement but insufficient to produce precipitation of the rubber.

This application is a continuation-in-part of my prior application, Serial No. 639,487, filed January 5, 1946, now abandoned. In this prior application the stabilization of heat-vulcanizing rubber cements was described and claimed. The present application is more specific in defining the cements to be stabilized.

Rubber cements are used as adhesives for coating materials such as fabrics and for the production of rubber articles by molding, dipping and the like in which the article is dried and vulcanized at some stage of the manufacturing process. These cements in general comprise natural vulcanizable rubber or butadiene rubber compositions dissolved in an organic solvent.

Numerous other substances may be incorporated in these rubber cements which may or may not be rubber solvents. These compounds are added for the purpose of imparting certain desired properties to the cement or the final rubber composition. They include both organic and inorganic substances such as fillers, plasticizers, vulcanizing agents, accelerators, anti-oxidants, etc. and are well known in the rubber art.

Two general types of vulcanizing rubber cements are recognized by the art. In one type the rubber used is a so-called degraded rubber which has been degraded by prolonged milling or other treatment designed to depolymerize the rubber molecules. These cements are usually made with high rubber concentrations ranging from about 35 to 50% or more of rubber. The degrading procedure substantially reduces the viscosities of rubber solutions made from such rubber, hence high concentrations are possible. This type of cement, while tending to form a reversible gel if too much solvent is evaporated, is generally not subject to the so-called irreversible gelation. Any gels formed by loss of solvent can be converted into sols or solutions by merely heating or adding a solvent.

The second type of vulcanizing rubber cement, with which the present invention is concerned, is prepared from an undegraded rubber, that is, a rubber which has not been depolymerized by milling, exposure to ultraviolet light or other process, and contains an ultra-accelerator. For this reason the concentrations of rubber which can be employed are substantially lower, ranging from about 2% to a maximum of about 25% of rubber by weight, owing to the relatively high viscosities of the solutions. These cements, while considered superior to those prepared from degraded rubber, have one important fault, namely they are subject to irreversible gelation. Most of these cements tend to form irreversible gels merely upon standing at room temperatures for long periods of time. This is usually due to spontaneous vulcanization. When a gel of this type is formed, it is impossible to reverse it by heating or by the addition of a solvent and, of course, the gelled cement is therefore worthless as a cement. It is an object of the present invention to improve this second type of rubber cement by incorporating therein a chemical reagent which serves as an inhibitor of irreversible gelation.

I have discovered that the tendency to form irreversible gels may be materially reduced or prevented by the addition of certain unsaturated alcohols to rubber cements of the second type described. The unsaturated alcohol may be a monohydric, alkyl or aralkyl alcohol having a double bond or a triple bond and from 3 to 10 carbon atoms. I have found that all alcohols of this type are operative to prevent or substantially retard irreversible gelation of my rubber cements. The hydroxyl group may occupy any position in the chain, either terminal or otherwise. The aralkyl alcohols which are applicable have side chains containing the hydroxyl group and an unsaturated group. These alcohols may contain other substituent groups, for example, halogens such as chlorine, bromine, etc.

Among the specific compounds which have been found useful there may be mentioned 2-methyl-2-pentene-4-ol, 2-propene-1-ol (allyl alcohol), 2-methyl-3-butyne-2-ol, 2-methyl-3-butene-2-ol, 1-hexyne-3-ol, 3,5-dimethyl-1-hexyne-3-ol and 3-phenyl-2-propene-1-ol (cinnamyl alcohol).

The unsaturated alcohol should preferably be liquid at ordinary temperatures, or should be soluble to a substantial extent in the rubber solvent used in the cement. The solubility of rubber in the unsaturated alcohol need not be substantial although in some cases it may aid in dissolving rubber. In any event it should not precipitate the rubber in the quantities used to prevent gelling.

The solvents used in my cements are those conventionally used for this purpose in the art, such as solvent naphthas, gasoline, petroleum ether, benzene, carbon tetrachloride, ethylene dichloride, toluene, etc. In considering the choice of solvent and inhibiting agent it is important, of course, to select these materials in such manner that the inhibiting agent is soluble in the rubber solvent at least to the extent required to produce the desired inhibiting effect and that the rubber is soluble in the mixture to the desired extent.

The method of preparing the rubber cement may be by dissolving natural or a butadiene rubber in the solvent and adding the anti-gelling agent to the solution thus formed either before, after or during the incorporation of other components such as vulcanizing agent, accelerator, plasticizer and filling material. If desired, more than one type of solvent may be used to keep the rubber and the various components in solution. In an alternative method of preparing my cement the vulcanizing agent, accelerator, plasticizer and any filling material may be incorporated with the rubber by milling for a short period, followed by dissolving the mix in a rubber solvent. If mixing is to be accomplished by milling, however, care must be employed not to prolong the milling to such an extent that any substantial degradation of the rubber is produced. Short milling periods of from about 3 to 15 minutes have been found satisfactory.

In certain instances it may be desired to add the unsaturated alcohol directly to the solvent before dissolving the rubber therein. This should be done as a rule only when using an alcohol in which rubber is soluble or which does not tend to precipitate the rubber from solution.

The amount of alcohol used may be from approximately 5% to about 20% based on the rubber and depending upon the alcohol employed. In any event, the amount must be less than that which will precipitate rubber from the cement. This will depend to a large extent upon the character of the specific compound employed since the solubility of rubber varies with the compound used. Usually 5 to 20% will give adequate protection against gelling for a period of months under ordinary conditions. The cements which gel most rapidly at atmospheric temperatures require larger amounts of protecting alcohol than the more stable cements.

Cements, made from undegraded synthetic unsaturated rubbers instead of natural rubber may also be treated according to my invention, provided that the synthetic rubber is of the sulfur-vulcanizing type. Thus, the so-called butadiene rubbers produced by the polymerization of butadiene or the co-polymerization of butadiene with styrene, acrylonitrile, etc. are among those applicable in this invention. Any unsaturated, sulfur-vulcanizing, undegraded rubber can be used.

This invention is not limited to the specific compounds employed in the following examples.

A stock rubber cement was prepared which contained 5% by weight of raw natural rubber in solution using benzene and mineral oil as the solvent. The mixture consisting of rubber, zinc oxide, sulfur, and accelerator mixed in the following proportions:

| | Parts by weight |
|---|---|
| Rubber | 100.0 |
| Zinc oxide | 5.0 |
| Sulfur | 3.0 |
| Accelerator | 1.0 |

The accelerator employed in the above formula was an equal mixture of zinc dibutyldithiocarbamate and polybutraldehyde aniline—a very rapid ultra-accelerator. By the term "ultra-accelerator" is meant any chemical compound that produces vulcanization of rubber at rates that are difficult to control under factory conditions. Any of these ultra-accelerators are suitable for use in my cement. Typical ultra-accelerators are Zinc dimethyldithiocarbamate
Zinc diethyldithiocarbamate
Zinc dibutyldithiocarbamate
Selenium diethyldithiocarbamate
Lead dimethyldithiocarbamate
Sodium dimethyldithiocarbamate
Pyridine pentamethylenedithiocarbamate The quantity of ultra-accelerator to be employed in my compositions depends to some extent upon the amount of sulfur used but is usually within the range of from about 0.1 to 1.0 per cent by weight based on the rubber.

In preparing the composition the rubber was mixed with the vulcanizing agent and accelerator by milling for about 10 minutes before being dissolved. The method for testing the rate of gelation is described in Industrial and Engineering Chemistry 33, 809, (1941).

In general, the test method consisted in storing the compounded cement in a closed container at 50° C. until gelling occurred or the test was terminated. The blank containing no anti-gelling agent gelled in five days.

*Example I*

To the above solution was added 10% of 2-propene-1-ol (allyl alcohol). The sample had not gelled after three months and twenty days as compared with gelation of the blank sample in approximately five days.

*Example II*

10% of 2-methyl-3-butyne-2-ol was added to the stock solution of rubber used in Example I. After three months and twenty days it had not formed a gel.

*Example III*

The rubber solution used in Example I was treated with 10% of 2-methyl-2-pentene-4-ol and the sample did not gel in three months of storage.

*Example IV*

Another stock rubber cement was prepared in a manner similar to that described above. It contained 5% of raw rubber in benzene and the stock sample gelled upon standing for forty hours. To a portion of the standard cement was added 10% of 3-phenyl-2-propene-1-ol (cinnamyl alcohol). After a period of 3.5 weeks, at which time the test was stopped, the cement had not gelled.

*Example V*

A sample of the rubber cement used in Example IV was treated with 10% of 1-hexyne-3-ol and did not gel in a period of three and one-half weeks.

*Example VI*

A sample of the rubber cement used in Example IV was treated with 10% of 3,5-dimethyl-1-hexyne-3-ol. It did not gel in a period of three weeks.

Example VII

10% of allyl alcohol was added to the stock solution of rubber used in Example I. This cement was stored for a period of 7 months and had not yet formed a gel.

Example VIII

10% of 2-methyl-3-butyne-2-ol was added to the stock solution of rubber used in Example I. The resulting cement was stored for a period of 7 months without gelling.

Example IX

A 5% stock rubber solution in benzene was prepared as above described from 100.0 parts by weight of butadiene-styrene copolymer, 2.5 parts by weight zinc oxide, 0.5 part by weight stearic acid, 0.5 part by weight sulfur, 0.5 part by weight of zinc dibutyldithiocarbamate and 0.5 part by weight of polybutyraldehyde aniline. A sample containing 5% 3,5-dimethyl-1-hexyne-3-ol had not gelled after five weeks' storage at 50° C., whereas a similar sample containing no anti-gelling agent gelled in eight days.

Example X

A solution prepared as in Example IX but containing as the rubber butadiene-acrylonitrile copolymer dissolved in methyl isobutyl ketone gelled at the end of 41 days' storage as compared to 27 days for a similar sample containing no 3,5-dimethyl-1-hexyne-3-ol.

Example XI

A solution prepared as in Example IX but containing as the rubber isobutylene-isoprene copolymer dissolved in benzene and 3,5-dimethyl-1-hexyne-3-ol as the anti-gelling agent had not gelled at the end of six months' storage, whereas a similar sample containing no anti-gelling agent had gelled at the end of four months.

While I have described what I consider to be the most advantageous embodiments of my process and product it is evident, of course, that various modifications can be made in the specific procedures and compositions which have been described without departing from the purview of this invention. Thus various known equivalents can be substituted for the specific ingredients mentioned in the foregoing description and the relative proportions of these ingredients can likewise be varied to a considerable extent. And any of the procedures conventionally used in the art for making rubber cements can be employed which are applicable. Further modifications which fall within the scope of the following claims will be evident to those skilled in this art.

I claim as my invention:

1. The rubber cement of claim 9 wherein said unsaturated alcohol is one containing a double bond.
2. The rubber cement of claim 9 wherein said unsaturated alcohol is one containing a triple bond.
3. The rubber cement of claim 9 wherein said unsaturated alcohol is 2-methyl-2-butyne-2-ol.
4. The rubber cement of claim 9 wherein said unsaturated alcohol is 2-methyl-2-pentene-4-ol.
5. The process of claim 10 wherein said unsaturated alcohol is one containing a double bond.
6. The process of claim 10 wherein said unsaturated alcohol is one containing a triple bond.
7. The process of claim 10 wherein mixing is conducted by dissolving the rubber in said solvent and then mixing in the other ingredients.
8. The process of claim 10 wherein mixing is conducted by milling the rubber with said sulfur, zinc oxide and accelerator for a period not exceeding about 15 minutes, followed by dissolving the mix in said rubber solvent and said alcohol.
9. A heat-vulcanizing rubber cement containing from about 2 to 25 per cent of an undegraded unsaturated, sulfur-vulcanizing rubber, selected from the group consisting of natural rubber, butadiene-styrene copolymer, butadiene-acrylonitrile copolymer and isobutylene-isoprene copolymer, dissolved in a rubber solvent, from about 1 to 5 per cent of zinc oxide, a small amount of sulfur, from about 0.1 to 1.0 per cent of an ultra-accelerator sufficiently rapid and in amount normally sufficient to cause irreversible gelation of the cement due to spontaneous vulcanization merely upon standing at room temperatures, but containing from about 5 to 20 per cent of an unsaturated monohydric alcohol containing from 3 to 10 carbon atoms sufficient to prevent irreversible gelation of the cement but insufficient to produce precipitation of the rubber; the components of the cement being mixed for a time period not substantially exceeding from about 3 to 15 minutes to prevent degradation of the rubber.
10. In the manufacture of heat-vulcanizing rubber cements containing components normally tending to cause irreversible gelation due to spontaneous vulcanization merely upon standing at room temperatures, the process which comprises mixing a rubber solvent with from about 2 to 25 per cent of an undegraded, unsaturated, sulfur-vulcanizing rubber, selected from a class consisting of natural rubber, butadiene-styrene copolymer, butadiene-acrylonitrile copolymer and isobutylene-styrene copolymer, with from about 1 to 5 per cent of zinc oxide, with a small amount of sulfur and with from about 0.1 to 1.0 per cent of an ultra-accelerator sufficiently rapid and in amount normally sufficient to cause irreversible gelation of the cement due to spontaneous vulcanization merely upon standing at room temperatures, but also mixing in from about 5 to 20 per cent of an unsaturated monohydric alcohol containing from 3 to 10 carbon atoms sufficient in amount to prevent irreversible gelation of the cement but insufficient to cause precipitation of the rubber; mixing of the cement being conducted within a short period not substantially exceeding about 3 to 15 minutes to prevent degradation of the rubber during mixing.

ARTHUR W. CAMPBELL.

REFERENCES CITED

The following references are of record in the file of this patent:

UNITED STATES PATENTS

| Number | Name | Date |
| --- | --- | --- |
| 1,916,421 | Hazell | July 4, 1933 |
| 2,000,028 | King | May 7, 1935 |
| 2,297,871 | Campbell | Oct. 6, 1942 |

FOREIGN PATENTS

| Number | Country | Date |
| --- | --- | --- |
| 47,938 | France | Aug. 23, 1937 |

OTHER REFERENCES

India Rubber World of July 1943, pp. 363–364.